(12) United States Patent
Narayanasamy

(10) Patent No.: US 7,369,031 B2
(45) Date of Patent: May 6, 2008

(54) POTENTIOMETER

(75) Inventor: Rajagopal Narayanasamy, Bangalore (IN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 84 days.

(21) Appl. No.: 11/435,645

(22) Filed: May 17, 2006

(65) Prior Publication Data

US 2006/0267725 A1    Nov. 30, 2006

(30) Foreign Application Priority Data

May 25, 2005    (JP)    ............... 2005-152072

(51) Int. Cl.
*H01L 43/04*    (2006.01)
(52) U.S. Cl. .................. 338/32 H; 338/68; 338/180
(58) Field of Classification Search .............. 338/32 H, 338/32 R, 12, 68, 180, 116
See application file for complete search history.

(56) References Cited

U.S. PATENT DOCUMENTS

| | | | |
|---|---|---|---|
| 3,988,710 A | 10/1976 | Sidor et al. | |
| 4,395,695 A | 7/1983 | Nakamura | |
| 4,716,395 A * | 12/1987 | Shimoda | ...................... 338/149 |
| 5,055,781 A * | 10/1991 | Sakakibara et al. | .... 324/207.21 |
| 5,144,276 A * | 9/1992 | Bertin et al. | ................. 338/162 |
| 6,028,502 A * | 2/2000 | McSwiggen | ................. 338/167 |
| 6,411,082 B2 | 6/2002 | Glasson | |
| 6,552,533 B2 | 4/2003 | Schodlbauer et al. | |
| 6,615,156 B2 | 9/2003 | Elliott et al. | |
| 2003/0218458 A1 | 11/2003 | Seger et al. | |

* cited by examiner

*Primary Examiner*—K. Richard Lee
(74) *Attorney, Agent, or Firm*—Armstrong Teasdale LLP

(57) ABSTRACT

A non-contact type potentiometer with high resolution of rotation amount detection applicable to endlessly multiple rotations. The potentiometer has an endlessly rotatable first shaft, a first detection unit that magnetically detects a rotation angle of the first shaft in a non-contact manner, an endlessly rotatable second shaft, a second detection unit that magnetically detects a rotation angle of the second shaft in a non-contact manner, a transmission unit that decreases the speed of the rotation of the first shaft and transmits the rotation to the second shaft, and an output unit that outputs an electric signal proportional to a rotation amount of the first shaft based on detection signals from the first detection unit and the second detection unit.

6 Claims, 4 Drawing Sheets

POTENTIOMETER

CROSS REFERENCE TO RELATED APPLICATIONS

This application claims the benefit of Japanese Application No. 2005-152072 filed May 25, 2005.

BACKGROUND OF THE INVENTION

The present invention relates to a potentiometer, and more particularly, to a potentiometer which generates an electric signal corresponding to a shaft rotation amount.

A potentiometer is used when an electric signal indicating the amount of displacement of an object is required. The potentiometer has a shaft which rotates by an external force and a converter which converts a rotation amount of the shaft to an electric signal.

In a potentiometer using a slide resistor for conversion of a rotation amount to an electric signal, as abrasion of a slide part degrades performance and operational stability with time, a non-contact type potentiometer is employed to avoid these inconveniences.

A non-contact type potentiometer utilizing magnetism is known. The potentiometer of this type has a magnet attached to an end of a shaft, and a sensor to detect a magnetic flux of the magnet as an electric signal. As the sensor, a Hall device or an inductance device is used (for example, see Patent Documents 1 and 2 respectively.)

As a potentiometer in which the amount of plural shaft rotations is converted to an electric signal in a non-contact manner, known is a potentiometer in which a screw stock to linearly move in correspondence with shaft rotation is provided inside of the shaft and the position of the end of the screw stock is magnetically detected. (for example, see Patent Document 3).

[Patent Document 1] U.S. Pat. No. 4,395,695 (column 2-4, FIGS. 1-3)

[Patent Document 2] U.S. Pat. No. 3,988,710 (column 1-3, FIGS. 1-2)

[Patent Document 2] U.S. Pat. No. 6,411,082 (column 2-3, FIG. 1)

In the constructions described in Patent Documents 1 and 2, merely a rotation amount for one or smaller shaft rotation is detected. Further, the resolution of rotation amount detection is low. In the construction described in Patent Document 3, a rotation amount for plural shaft rotations can be detected, however, the maximum rotation amount is limited.

SUMMARY OF THE INVENTION

Therefore, an object of the present invention is to provide a non-contact type potentiometer applicable to endlessly multiple rotations, with high resolution of rotation amount detection.

To solve the above problem, the present invention provides a potentiometer comprising: an endlessly rotatable first shaft; first detection means for magnetically detecting a rotation angle of said first shaft in a non-contact manner; an endlessly rotatable second shaft; second detection means for magnetically detecting a rotation angle of said second shaft in a non-contact manner; transmission means for increasing the speed of rotation of said first shaft and transmitting the rotation to said second shaft; and output means for outputting an electric signal proportional to a rotation amount of said first shaft based on a detection signal from said first detection means and a detection signal from said second detection means.

It is preferable that said transmission means has a gear mechanism in point of transmission of rotation at an accurate rotational ratio.

It is preferable that said output means outputs an analog signal in point of obtaining an analog signal indicating a rotation amount.

It is preferable that said output means outputs a digital signal in point of obtaining a digital signal indicating a rotation amount.

It is preferable that said output means outputs an analog signal and a digital signal in point of obtaining an analog signal and a digital signal indicating a rotation amount.

It is preferable that the potentiometer further comprises a housing that accommodates at least a part of said first shaft, said second shaft, said first detection means, said second detection means, said transmission means and said output means, in point of easily enabling a component potentiometer.

According to the present invention, as the potentiometer comprises: an endlessly rotatable first shaft; first detection means for magnetically detecting a rotation angle of said first shaft in a non-contact manner; an endlessly rotatable second shaft; second detection means for magnetically detecting a rotation angle of said second shaft in a non-contact manner; transmission means for increasing the speed of rotation of said first shaft and transmitting the rotation to said second shaft; and output means for outputting an electric signal proportional to a rotation amount of said first shaft based on a detection signal from said first detection means and a detection signal from said second detection means, a non-contact type having a high resolution of rotation amount detection applicable to endlessly multiple rotations can be realized.

Further objects and advantages of the present invention will be apparent from the following description of the preferred embodiments of the invention as illustrated in the accompanying drawings.

DETAILED DESCRIPTION OF THE INVENTION

Figure 1:
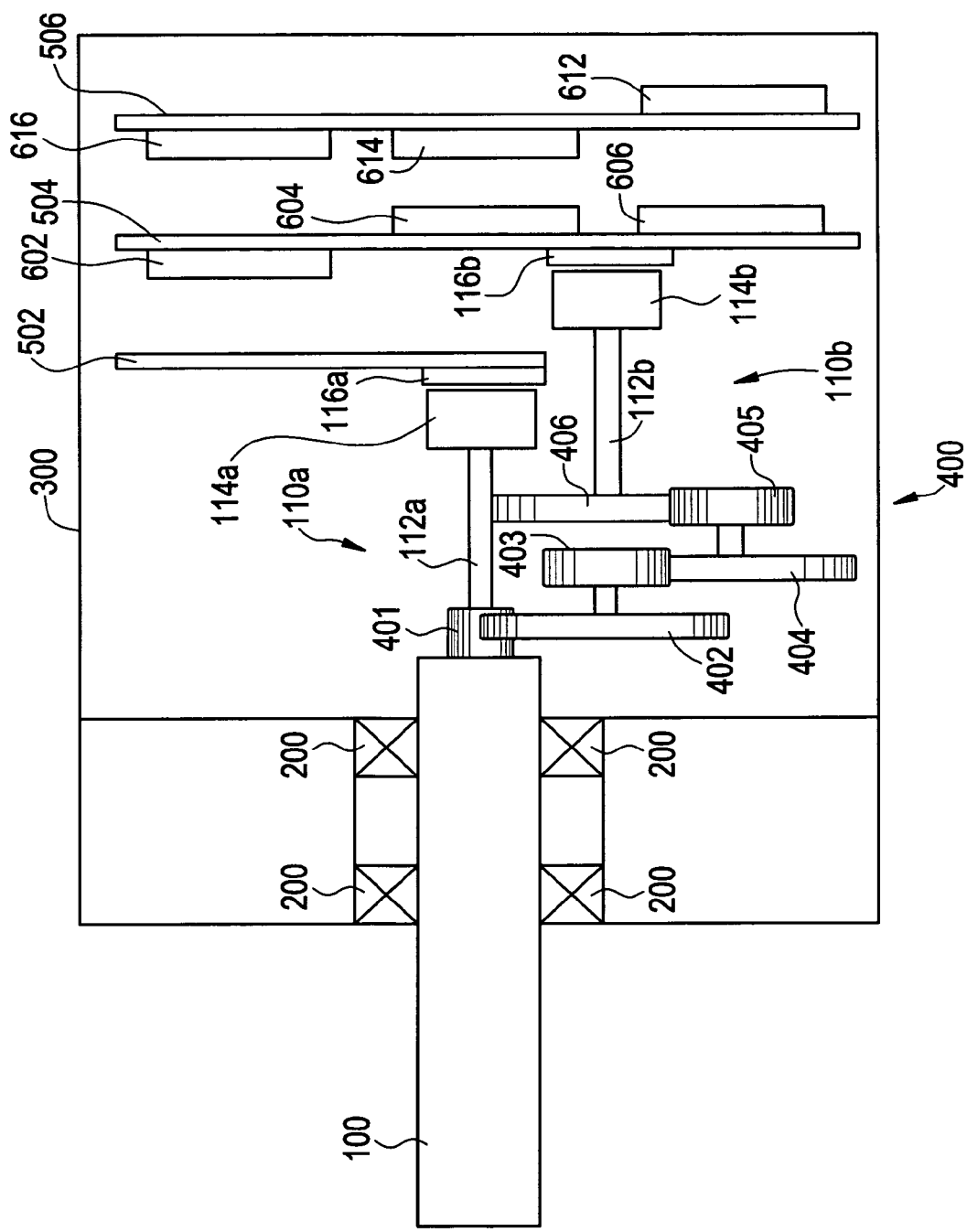
FIG. 1 is a diagram showing the schematic construction as an example of the best mode for carrying out the invention.

Hereinbelow, a best mode for carrying out the invention will be described in detail with reference to the drawings. Note that the present invention is not limited to the best mode for carrying out the invention. FIG. 1 shows a schematic construction of a potentiometer. The present device is an example of the best mode for carrying out the invention. The construction of the device shows an example of the best mode for carrying out the invention related to a potentiometer.

As shown in FIG. 1, the present device has a shaft 100. The shaft 100 is rotatably attached to a housing 300 with a bearing 200. The shaft 100 is endlessly rotatable. One end of the shaft 100 is outside of the housing 300 from the bearing 200, and the other end, inside of the housing 300. The housing 300 is an example of the housing in the present invention.

Two rotary encoders 110a and 110b are accommodated in the housing 300. The rotary encoder 110a has a magnet 114a attached to an end of a rotation shaft 112a and a sensor 116a opposing the magnet in a non-contact manner. The rotary encoder 110a is an example of the first detection means in the present invention. The rotary encoder 110b has a magnet 114b attached to an end of a rotation shaft 112b and a sensor 116b opposing the magnet in a non-contact manner. The rotary encoder 110b is an example of the second detection means in the present invention.

Figure 2:
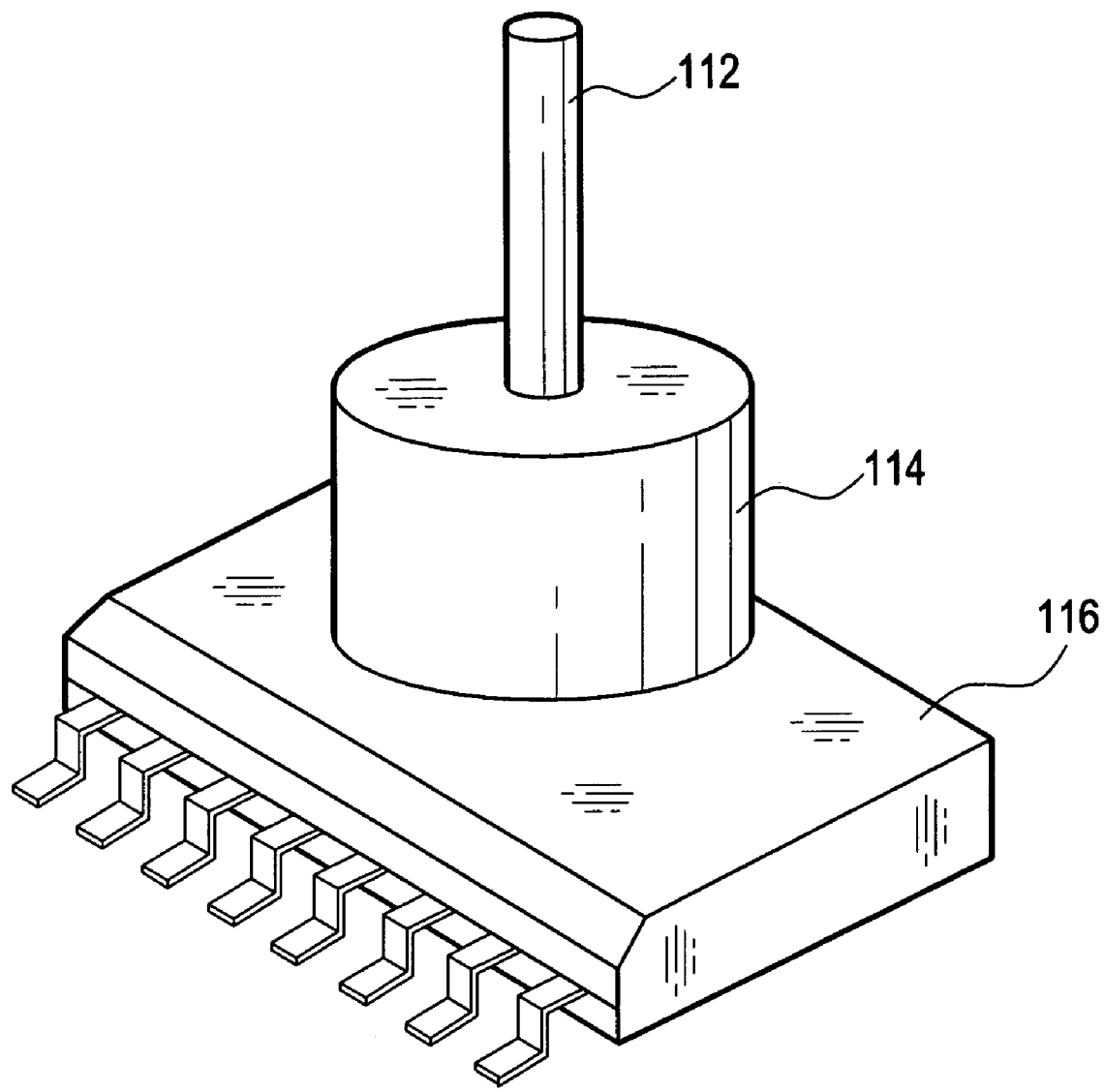
FIG. 2 is a diagram showing the structure of the rotary encoder in an example of the best mode for carrying out the invention.

FIG. 2 shows the structure of the rotary encoder. The magnet 114 is a column-shaped permanent magnet magnetized in one direction along its diameter. The sensor 116 is an ASIC package including a Hall device and its auxiliary electronic circuits.

The sensor 116 outputs an electric signal indicating a rotational position of the magnet 114. The electric signal is, e.g., a signal indicating the 360° rotation angle of the magnet 114 as 1024 steps. The rotary encoder is a part in the marketplace.

The rotation shaft 112a of the rotary encoder 110a is coaxially attached to the end of the shaft 100. The rotation shaft 112b of the rotary encoder 110b is connected to the end of the shaft 100 via a gear mechanism 400.

A part including the shaft 100 and the rotation shaft 112a is an example of the first shaft in the present invention. The rotation shaft 112b is an example of the second shaft in the present invention. The gear mechanism 400 is an example of the transmission means in the present invention, and an example of the gear mechanism. The rotation of the shaft 100 can be transmitted to the rotation shaft 112b at an accurate rotational ratio by using the gear mechanism.

Figure 3:
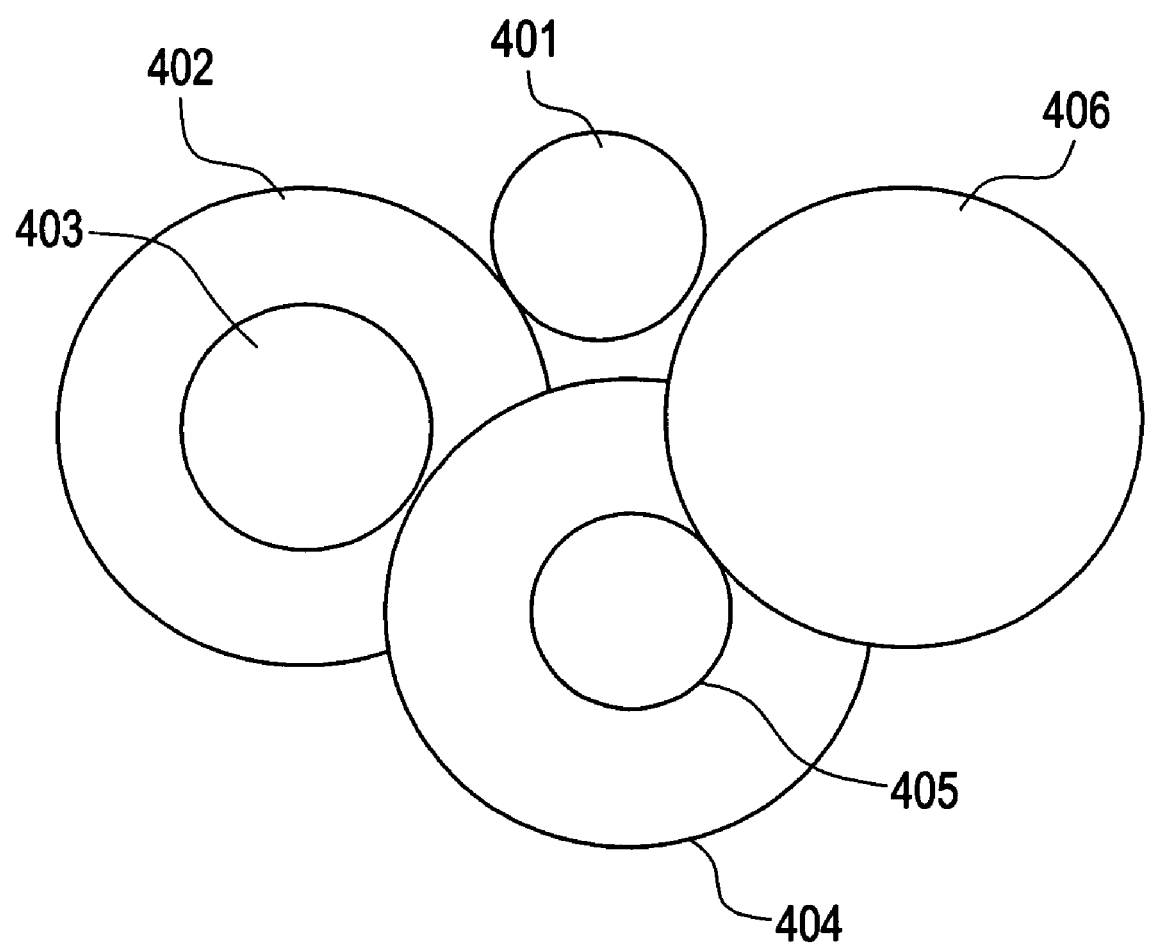
FIG. 3 is a diagram showing the structure of the gear mechanism in an example of the best mode for carrying out the invention.

FIG. 3 shows the gear mechanism 400 viewed from the rotation shaft direction. The gear mechanism 400 has e.g. six gears 401 to 406. The gear 401 is coaxially attached to the end of the shaft 100. The gears 402 to 406 are supported with appropriate bearings (not shown).

The gear 401 engages with the gear 402. The gear ratio between the gears 401 and 402 is 1:A ($\geq 1$). The gear 403 is coaxially attached to the gear 402. The gear 403 engages with the gear 404. The gear ratio between the gears 403 and 404 is 1:B ($\geq 1$). The gear 405 is coaxially attached to the gear 404. The gear 405 engages with the gear 406. The gear ratio between the gears 405 and 406 is 1:C ($\geq 1$). The rotation shaft 112b of the rotary encoder 110b is coaxially attached to the gear 406.

The rotation shaft 112a of the rotary encoder 110a rotates at a ratio of 1:1 to rotation of the shaft 100. The rotation shaft 112b of the rotary encoder 110b rotates at a ratio of N:1 (N$\geq$1) to the rotation of the shaft 100. That is, the gear mechanism 400 is a speed decreasing gear mechanism.

In this arrangement, the rotation shaft 112b of the rotary encoder 110b endlessly rotates at a ratio of 1 rotation per N rotations of the rotation shaft 112a of the rotary encoder 110a. The value of N is e.g. 10, however, the value is not limited to this value but may be an appropriate value. Thus a detection signal representing 1 rotation of the shaft 100 as e.g. 1024 steps and a detection signal representing 10 rotations of the shaft 100 as e.g. 1024 steps can be obtained by using the rotary encoder 110a and the rotary encoder 110b in this relation.

Print circuit boards 502 to 506 are provided in the housing 300. The print circuit boards 502 to 506 are supported with support means (not shown), and mutually electrically connected with signal lines (not shown). The housing 300 has a terminal (not shown) to connect power supply to these print circuit boards and signal transmission/reception to/from the print circuit boards from the outside.

The sensors 116a and 116b of the rotary encoders 110a and 110b are respectively provided on the print circuit boards 502 and 504. A processor 602 to process output signals from the sensors 116a and 116b and its interfaces 604 and 606 are provided on the print circuit board 504. As the processor 602, a DSP, for example, is employed. A power circuit 612 and auxiliary circuits 614 and 616 are provided on the print circuit board 506.

Figure 4:
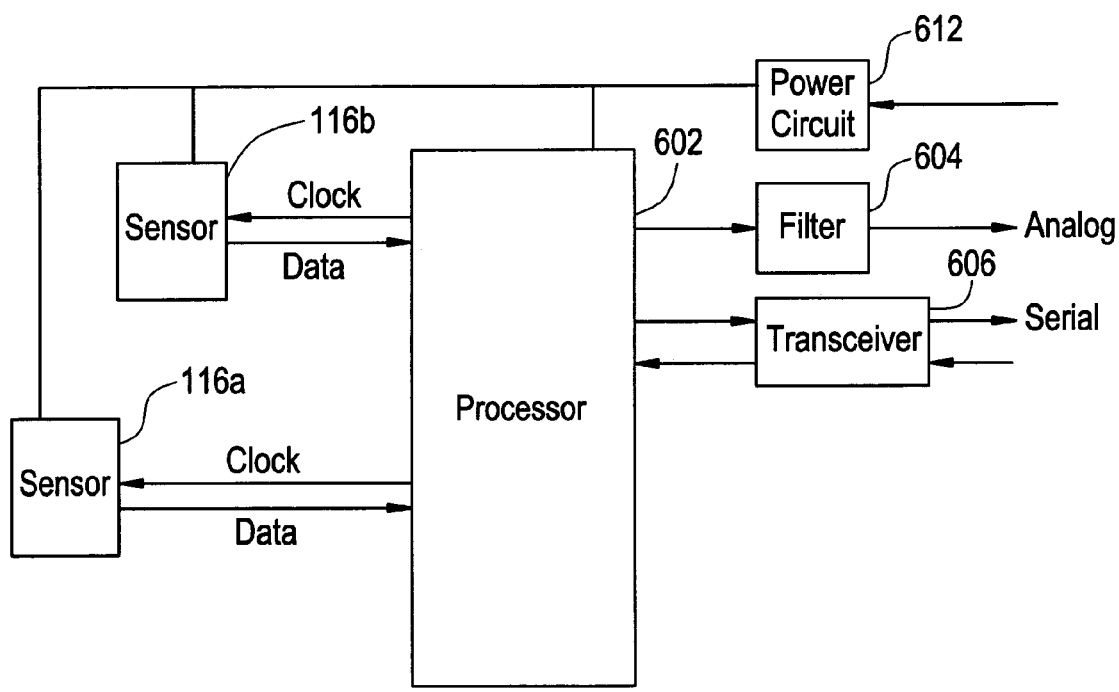
FIG. 4 is a diagram showing the electrical construction of an example of the best mode for carrying out the invention.

FIG. 4 shows a block diagram of the electrical construction of the present device. The sensors 116a and 116b of the rotary encoders 110a and 110b input the respective detection signals into the processor 602 based on a clock supplied from the processor 602. The detection signals are inputted as digital data.

The input signal from the sensor 116a has a resolution of e.g. 1024 per 1 rotation of the shaft 100. The input signal from the sensor 116b has a resolution of e.g. 1024 per 10 rotations of the shaft 100.

The processor 602 processes the input signals to obtain data indicating the rotation amount of the shaft 100 with resolution of e.g. 1048576 ($2^{20}$) per 10 rotations. The data is outputted respectively as a pulsewidth modulation signal and digital data.

The pulsewidth modulation signal is outputted as an analog signal through a filter 604, and the digital data is outputted as serial data through a transceiver 606. Note that it may be arranged such that only the analog signal or the serial data is outputted. A part including the processor 602, the filter 604 and the transceiver 606 is an example of the output means in the present invention.

The sensors 116a and 116b, the processor 602, the filter 604 and the transceiver 606 are supplied with electric power, voltage-converted from 12 V to 3.3 V, from an external power source through a power circuit 612.

The output signal from the present device indicates the rotation amount of the shaft 100 with resolution of e.g. 1048576 ($2^{20}$) per 10 rotations. In this arrangement, the present device is a non-contact type potentiometer which outputs a signal indicating the rotation amount of the shaft 100 with high resolution. Further, as the shaft 100 is endlessly rotatable, the device is applicable to unlimited multiple rotations.

Further, as the processor 602 is programmable, a reference rotation position i.e. zero position of the shaft 100 can be arbitrarily set.

Further, as all the constituent elements are accommodated in the housing, the present device can be realized as a downsized and compact component. Since this compact device enables analog output, the conventional analog-type potentiometer can be easily replaced with the present device.

Many widely different embodiments of the invention may be configured without departing from the spirit and the scope of the present invention. It should be understood that the present invention is not limited to the specific embodiments described in the specification, except as defined in the appended claims.

The invention claimed is:

1. A potentiometer comprising:
   an endlessly rotatable first shaft;
   a first detection unit for magnetically detecting a rotation angle of said first shaft in a non-contact manner;
   an endlessly rotatable second shaft;
   a second detection unit for magnetically detecting a rotation angle of said second shaft in a non-contact manner;
   a transmission unit for increasing the speed of rotation of said first shaft and transmitting the rotation to said second shaft; and
   an output unit for outputting an electric signal proportional to a rotation amount of said first shaft based on a detection signal from said first detection unit and a detection signal from said second detection unit.

2. The potentiometer according to claim 1, wherein said transmission unit has a gear mechanism.

3. The potentiometer according to claim 1, wherein said output unit outputs an analog signal.

4. The potentiometer according to claim 1, wherein said output unit outputs a digital signal.

5. The potentiometer according to claim claim 1, wherein said output unit outputs an analog signal and a digital signal.

6. The potentiometer according to any one of claims claim 1, further comprising a housing that accommodates at least a part of said first shaft, said second shaft, said first detection unit, said second detection unit, said transmission unit and said output unit.

* * * * *